(12) United States Patent
Kim et al.

(10) Patent No.: US 12,015,537 B2
(45) Date of Patent: Jun. 18, 2024

(54) METHOD FOR MANAGING NETWORK FAILURE IN CLOUD ENVIRONMENT AND NETWORK FAILURE MANAGEMENT SYSTEM

(71) Applicant: Foundation of Soongsil University-Industry Cooperation, Seoul (KR)

(72) Inventors: Young Han Kim, Seoul (KR); Ho Joon Won, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 0 days.

(21) Appl. No.: 17/774,248

(22) PCT Filed: Apr. 28, 2020

(86) PCT No.: PCT/KR2020/005611
§ 371 (c)(1),
(2) Date: May 4, 2022

(87) PCT Pub. No.: WO2021/091035
PCT Pub. Date: May 14, 2021

(65) Prior Publication Data
US 2022/0393962 A1 Dec. 8, 2022

(30) Foreign Application Priority Data
Nov. 5, 2019 (KR) .................. 10-2019-0140272

(51) Int. Cl.
*H04L 43/50* (2022.01)
*H04L 41/0681* (2022.01)
*H04L 41/069* (2022.01)
*H04L 43/16* (2022.01)

(52) U.S. Cl.
CPC .......... *H04L 43/50* (2013.01); *H04L 41/0681* (2013.01); *H04L 41/069* (2013.01); *H04L 43/16* (2013.01)

(58) Field of Classification Search
CPC ... H04L 43/50; H04L 41/0681; H04L 41/069; H04L 43/16
See application file for complete search history.

(56) References Cited

U.S. PATENT DOCUMENTS

2002/0183972 A1* 12/2002 Enck ................... H04L 41/5019
702/186
2011/0320586 A1* 12/2011 Maltz .................. H04L 43/0817
709/224
2017/0168914 A1* 6/2017 Altman ................ G06F 11/079

FOREIGN PATENT DOCUMENTS

KR 10-2016-0028247 A 3/2016
KR 10-1702583 B1 2/2017
(Continued)

OTHER PUBLICATIONS

Ho Joon Won et al., "A Design of Architecture for Automated Fault Management System in a Cloud", 29 Joint Conference on Communications and Information. Gangreung, South Korean. May 3, 2019 (English Translation) (Year: 2019).*

(Continued)

*Primary Examiner* — Philip C Lee
(74) *Attorney, Agent, or Firm* — Stein IP, LLC

(57) ABSTRACT

Disclosed are a method for performing network fault management in a cloud environment and a network fault management system. A method for performing network fault management in a cloud environment according to another exemplary embodiment of the present invention includes steps of measuring, by testing tools, the performance of a target server and transmitting a measurement result to a fault management unit, determining, by the fault management (Continued)

unit, a threshold and a policy for a target host based on the transmitted measurement result, generating, by the fault management unit, templated information including the determined threshold and policy, transmitting, by the fault management unit, the templated information to monitoring tools, and setting, by the monitoring tools, a monitoring policy of the target host based on the transmitted information.

3 Claims, 6 Drawing Sheets

(56) References Cited

FOREIGN PATENT DOCUMENTS

| | | | |
|---|---|---|---|
| KR | 10-1910926 | B1 | 10/2018 |
| KR | 10-2019-0047809 | A | 5/2019 |
| WO | 2013/006708 | A1 | 1/2013 |

OTHER PUBLICATIONS

Jung Moon Lee et al., "An Implementation of Root Cause Analysis on OpenStack-based Cloud System", Proceedings of Symposium of the Korean Institute of communications and Information Sciences, Korea Institute Of Communication Sciences. pp. 335-337. Nov. 2018.

Ho Joon Won et al., "A Design of Architecture for Automated Fault Management System in a Cloud", 29th Joint Conference on Communications and Information. Gangreung, South Korea. May 3, 2019.

* cited by examiner

METHOD FOR MANAGING NETWORK FAILURE IN CLOUD ENVIRONMENT AND NETWORK FAILURE MANAGEMENT SYSTEM

TECHNICAL FIELD

The present invention relates to a method for performing network fault management in a cloud environment and a network fault management system.

BACKGROUND ART

As a network environment gradually becomes cloudification, the demand for a network fault management system is increasing. The network fault management system refers to a system that monitors network hardware such as various types of network services, servers, and the like in a cloud environment to promptly notify an administrator of the occurrence of a fault when a fault occurs, and enables a response thereto. The cloud system may have increased availability through the network fault management system.

Meanwhile, the network fault management system sets a threshold that is a criterion for generating an alarm event, but there is a limit to increasing the availability of the cloud system if a threshold irrelevant to the performance of a target server is set. Therefore, research on a network fault management system capable of further increasing the availability of the cloud system is in progress.

As related art, there exists Korean Patent Registration No. 10-1702583 (Invention Title: A system for monitoring a network performance using XMPP(Extensible Messaging and Presence Protocol) and monitoring method thereof, published Feb. 3, 2017)

DISCLOSURE

Technical Problem

An aspect of the present invention is to provide a network fault management system and a method for performing network fault management capable of increasing the availability of the system by setting an accurate threshold of a cloud system by using testing tools and transmitting information to monitoring tools.

The objects to be solved by the present disclosure are not limited to the aforementioned object(s), and other object(s), which are not mentioned above, will be apparent to those skilled in the art from the following description.

Technical Solution

According to an aspect of the present invention, a network fault management system for a cloud environment includes testing tools configured to measure the performance of a target server and output a measurement result, a fault management unit configured to receive and analyze the measurement result output by the testing tools, determine a threshold and a policy for a target host based on the analyzed result, and output a determination result, and monitoring tools configured to set a monitoring policy of the target host based on the determination result output by the fault management unit.

Preferably, the fault management unit of the fault management system according to an exemplary embodiment may include a testing tools gateway configured to ask the testing tools to measure the performance of the target server and receive the performance measurement result, an evaluator configured to determine a threshold and a policy for the target host, a monitoring tools gateway configured to transmit templated information including the threshold and the policy to transmit the templated information to the monitoring tools, and a plugin manager configured to transmit the performance measurement result of the target server received from the testing tools gateway to the evaluator, and receive the threshold and the policy for the target host from the evaluator to generate templated information including the threshold and the policy and transmit the generated templated information to the monitoring tools gateway.

Preferably, the monitoring tools gateway may receive data from the monitoring tools in real time and verify the target host according to a predetermined period.

Preferably, the evaluator may calculate the threshold based on at least one of a rule-based calculation method and a machine learning-based calculation method.

Preferably, when the monitoring tools are implemented based on Zabbix, the templated information may include at least one of an item, a threshold (trigger), and an action, and the monitoring tools may set and update a target host to be monitored based on Zabbix API and scripts.

According to another aspect of the present invention, a method for performing network fault management in a cloud environment includes steps of measuring, by a testing tools, the performance of a target server and transmitting a measurement result to a fault management unit, determining, by the fault management unit, a threshold and a policy for a target host based on the transmitted measurement result, generating, by the fault management unit, templated information including the determined threshold and policy, transmitting, by the fault management unit, the templated information to a monitoring tools, and setting, by the monitoring tools, a monitoring policy of the target host based on the transmitted information.

Detailed contents of other exemplary embodiments are included in the detailed description and the accompanying drawings.

Advantageous Effects

According to the present invention, the network fault management system and the method for performing network fault management have an effect of improving the availability of the system by setting an accurate threshold for a target host according to the performance of a target server.

Further, in the network fault management system and the method for performing network fault management according to the present invention, the testing tools measures the performance of the target server and transmits a policy determined according to the verification result to the monitoring tools to set a policy of the monitoring tools reflecting a current state of the target server.

BEST MODE

Figure 1:
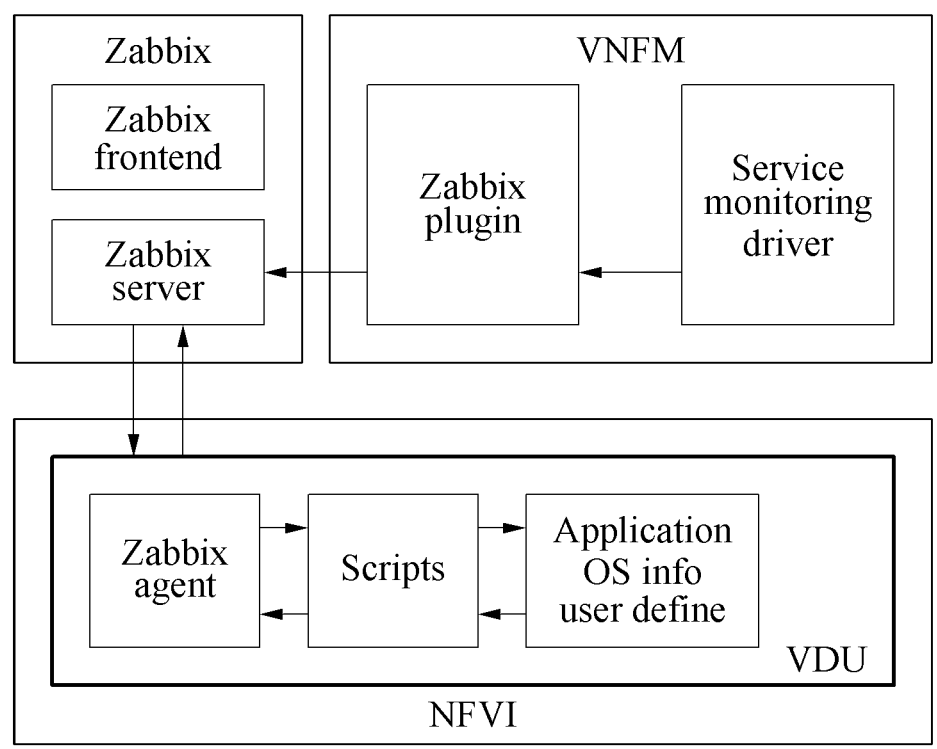
FIG. 1 is a diagram for describing a conventional Zabbix open stack interworking structure.

Advantages and/or features of the present invention, and a method for achieving the advantages and/or features will become obvious with reference to exemplary embodiments to be described below in detail together with the accompanying drawings. However, the present invention is not limited to the exemplary embodiments set forth below, and will be embodied in various different forms. The present exemplary embodiments are just for rendering the disclosure of the present invention complete and are set forth to provide a complete understanding of the scope of the invention to a person with ordinary skill in the technical field to which the present invention pertains, and the present invention will only be defined by the scope of the claims. Like reference numerals refer to like elements throughout the specification.

Hereinafter, exemplary embodiments of the present invention will be described in detail with reference to the accompanying drawings.

FIG. 1 is a diagram for describing a conventional Zabbix open stack interworking structure.

Various monitoring tools have been developed to improve the availability of a cloud system. In OpenStack, a representative open source cloud, a monitoring structure of the cloud system was proposed through interworking between Zabbix and VNFM. The Zabbix is one of the network fault management systems for a cloud environment.

Referring to FIG. 1, the Zabbix includes a Zabbix server and a Zabbix agent. Among them, the Zabbix agent is installed on a target server and transmits information about a hardware status, running virtual machines and applications to the Zabbix server. The Zabbix server analyzes the transmitted information to generate an alarm event according to a threshold of a template configured by an administrator through the Zabbix Plugin and transmits an action according to the policy to the Zabbix agent in the form of scripts to increase the availability of the cloud system.

However, since the network fault management system of FIG. 1 sets a threshold irrelevant to the state of the cloud system, there is a limitation in improving the availability of the cloud system. Accordingly, a structure capable of further increasing the availability of the cloud system is required.

Figure 2:
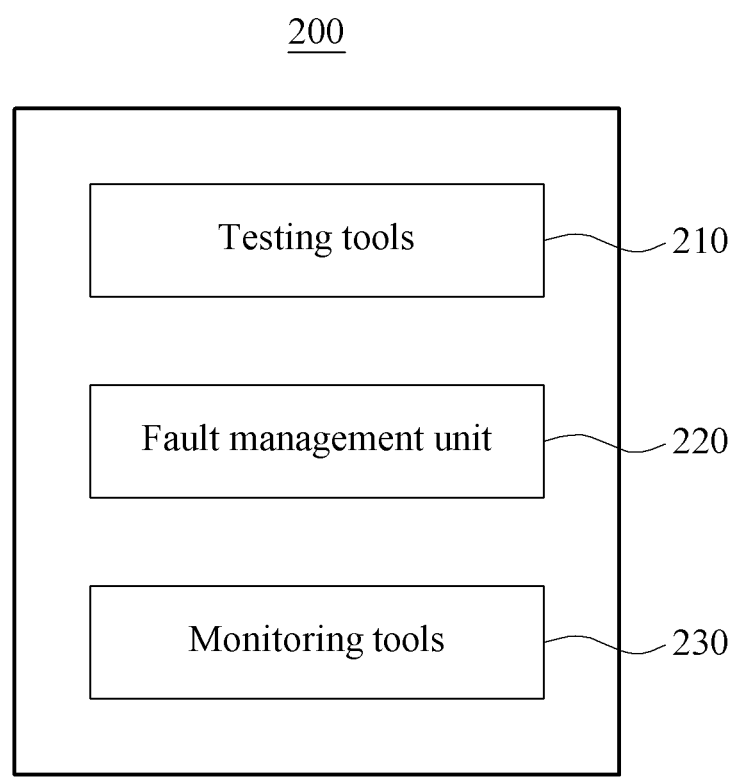
FIG. 2 is a block diagram illustrating a network fault management system according to an exemplary embodiment of the present invention.

FIG. 2 is a block diagram illustrating a network fault management system according to an exemplary embodiment of the present invention.

The network fault management system according to an exemplary embodiment discloses a system for setting an accurate threshold of a cloud system using a testing tool and receiving information from monitoring tools to increase the availability of the system.

Meanwhile, in order for the administrator to set an accurate threshold according to a state of a system resource, it is necessary to measure the performance capable of confirming a capacity of the system. However, a Yardstick of OPNFV (an Open Platform to accelerate Network Functions Virtualization) may provide a function of setting a scenario to be tested by the administrator, deploying the set scenario in the cloud environment, and transmitting an execution result of the scenario to the administrator. Accordingly, the Yardstick may be used to test a system to be configured by an actual administrator and confirm a threshold.

A network fault management system 200 according to another exemplary embodiment may include testing tools 210, a fault management unit 220, and monitoring tools 230.

The testing tools 210 may measure the performance of a target server and output a measurement result.

The fault management unit 220 may receive and analyze the measurement result output by the testing tools 210, determine a threshold and a policy for a target host based on the analyzed result, and output a determination result.

The monitoring tools 230 may set a monitoring policy of the target host based on the determination result output by the fault management unit 220.

Figure 3:
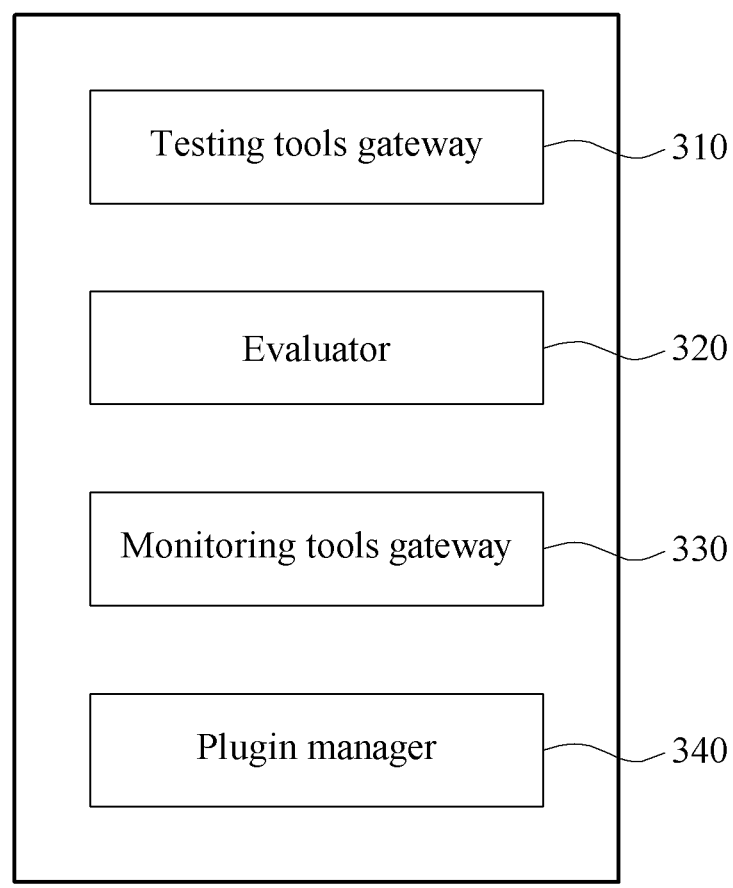
FIG. 3 is a block diagram illustrating a fault management unit of the network fault management system according to an exemplary embodiment of the present invention.

FIG. 3 is a block diagram illustrating a fault management unit of the network fault management system according to an exemplary embodiment of the present invention.

A fault management unit 300 according to an exemplary embodiment may include a testing tools gateway 310, an evaluator 320, a monitoring tools gateway 330, and a plugin manager 340.

The testing tools gateway 310 may ask the testing tools to measure the performance of the target server and receive the performance measurement result.

The evaluator 320 may determine a threshold and a policy for the target host. In this case, the evaluator 320 may utilize at least one of a rule-based method and a machine learning-based method in order to calculate the threshold. Among them, the rule-based method does not require data collection required for analysis, but has a disadvantage in that it is difficult to respond to all situations of the target server. On the other hand, in the case of the machine learning-based method, the initial training cost is relatively high, but the performance increases as time elapses, and even in a situation that the method is not input into a learned model, it is predictable and thus, it is possible to respond to various situations. Accordingly, the evaluator 320 of the network fault management system according to an exemplary embodiment may calculate a threshold using at least one of the rule-based method and the machine learning-based method according to specific requirements of the system.

The monitoring tools gateway 330 may transmit templated information including the threshold and the policy to transmit the templated information to the monitoring tools. In addition, the monitoring tools gateway 330 may receive data from the monitoring tools in real time and verify the target host according to a predetermined period.

The plugin manager 340 may transmit the performance measurement result of the target server received from the testing tools gateway 310 to the evaluator 320, and receive the threshold and the policy for the target host from the evaluator 320 to generate templated information including the threshold and the policy and transmit the generated templated information to the monitoring tools gateway 330.

In addition, the plugin manager 340 may ask an API to the testing tools to be used by the testing tools gateway 310 in a user environment to perform the performance measurement of the system, and may receive the corresponding measurement result value. In this case, the plugin manager 340 may receive the threshold and the policy for the target host by asking for the evaluator 320, and generate templated information including the threshold and the policy to transmit the templated information to the monitoring tools gateway 330.

Figure 4:
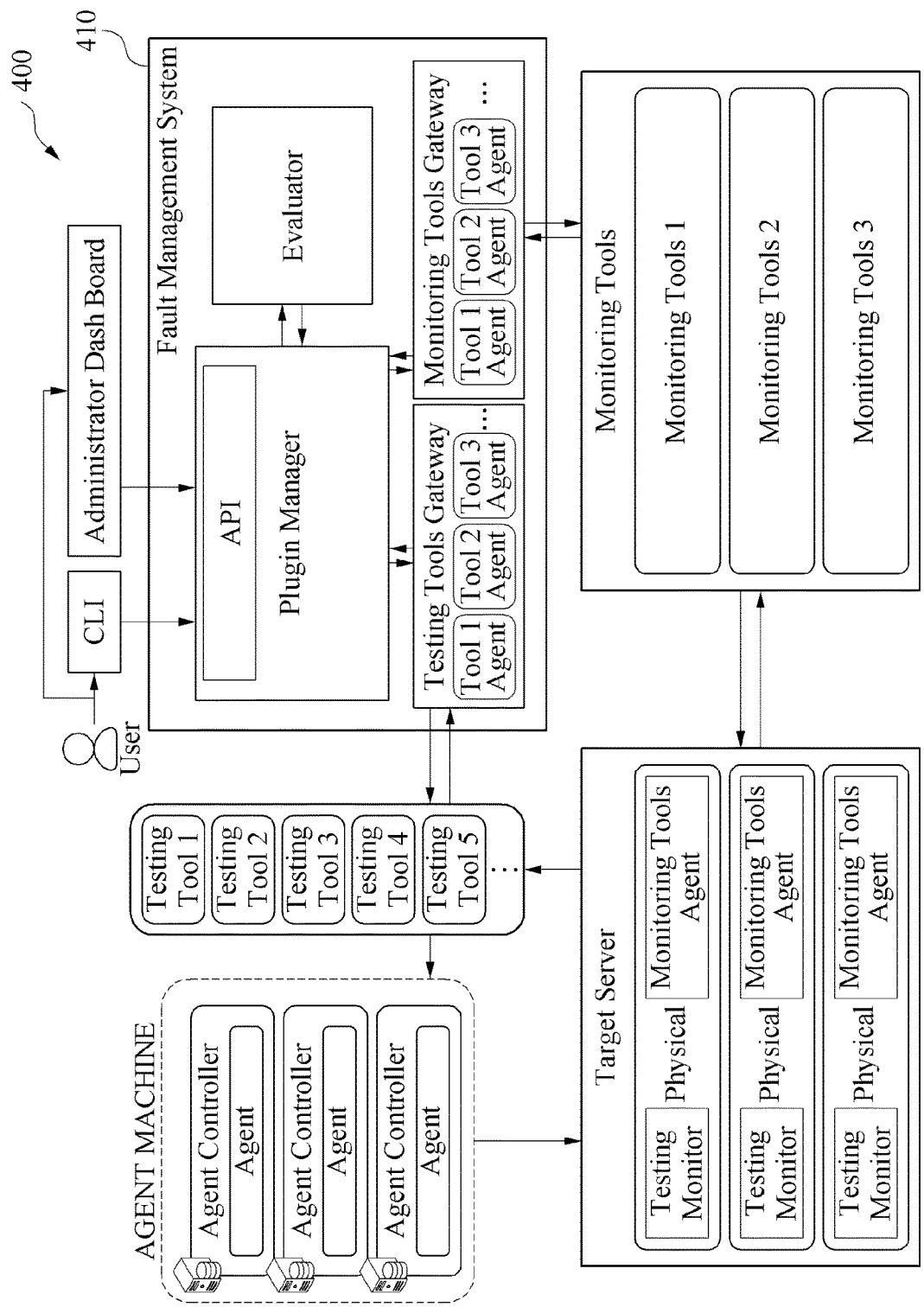
FIG. 4 is a diagram for describing an internal/external interworking structure of the network fault management system according to an exemplary embodiment of the present invention.

FIG. 4 is a diagram for describing an internal/external interworking structure of the network fault management system according to an exemplary embodiment of the present invention.

A network fault management system 400 according to an exemplary embodiment of the present invention may include various monitoring tools, testing tools 1 to testing tools 5, and a fault management unit 410.

When the testing tools 1 to testing tools 5 measure the performance of a target server, verify the actual performance in consideration of a cloud environment, and transmit a verification result to the fault management unit 410, the fault management unit 410 may analyze the verification result.

In addition, the fault management unit 410 converts a policy suitable for a performance level of the current system according to an APIs format of the monitoring tools to be used through the analysis result, and asks the APIs to the monitoring tools.

Since the network fault management system 400 of the present invention may set a policy of the monitoring tools reflecting a current system state through the testing tools 1 to testing tools 5, real-time reflection of the system state and automation of policy settings are enabled.

Figure 5:
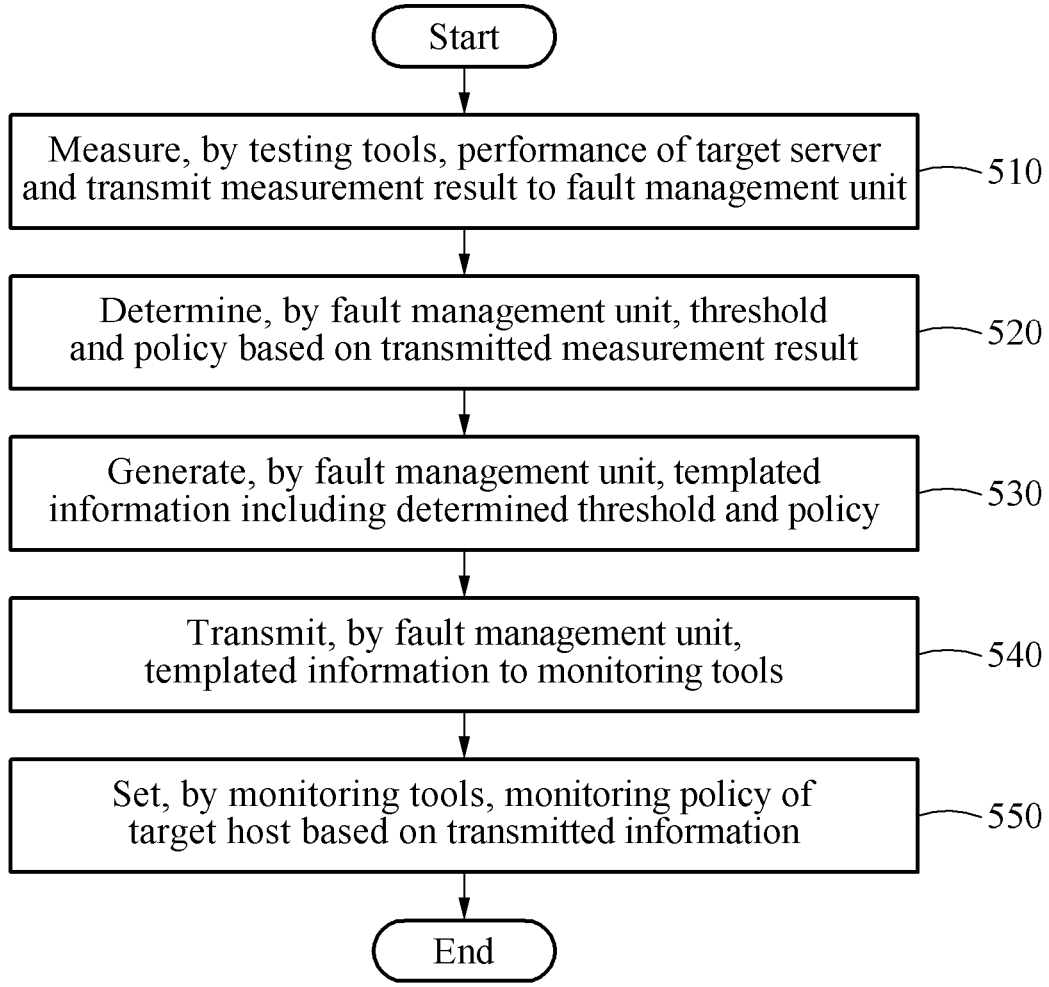
FIG. 5 is a flowchart for describing a method for performing network fault management in a cloud environment according to an exemplary embodiment of the present invention.

FIG. 5 is a flowchart for describing a method for performing network fault management in a cloud environment according to an exemplary embodiment of the present invention.

In step 510, testing tools may measure the performance of a target server and transmit the measurement result to a fault management unit.

In step 520, the fault management unit may determine a threshold and a policy for a target host based on the transmitted measurement result. In this case, an evaluator of the fault management unit may calculate a threshold based on at least one of a rule-based calculation method and a machine learning-based calculation method.

In step 530, the fault management unit may generate templated information including the determined threshold and policy.

In step 540, the fault management unit may transmit the templated information to the monitoring tools.

In step 550, based on the transmitted information, the monitoring tools may set a monitoring policy of the target host. At this time, the monitoring tools gateway of the fault management unit may receive data from the monitoring tools in real time and verify the target host according to a predetermined period.

If the monitoring tools is implemented based on Zabbix, the templated information includes at least one of an item, a threshold (trigger), and an action, and the monitoring tools may set and update a target host to be monitored based on Zabbix API and scripts.

Figure 6:
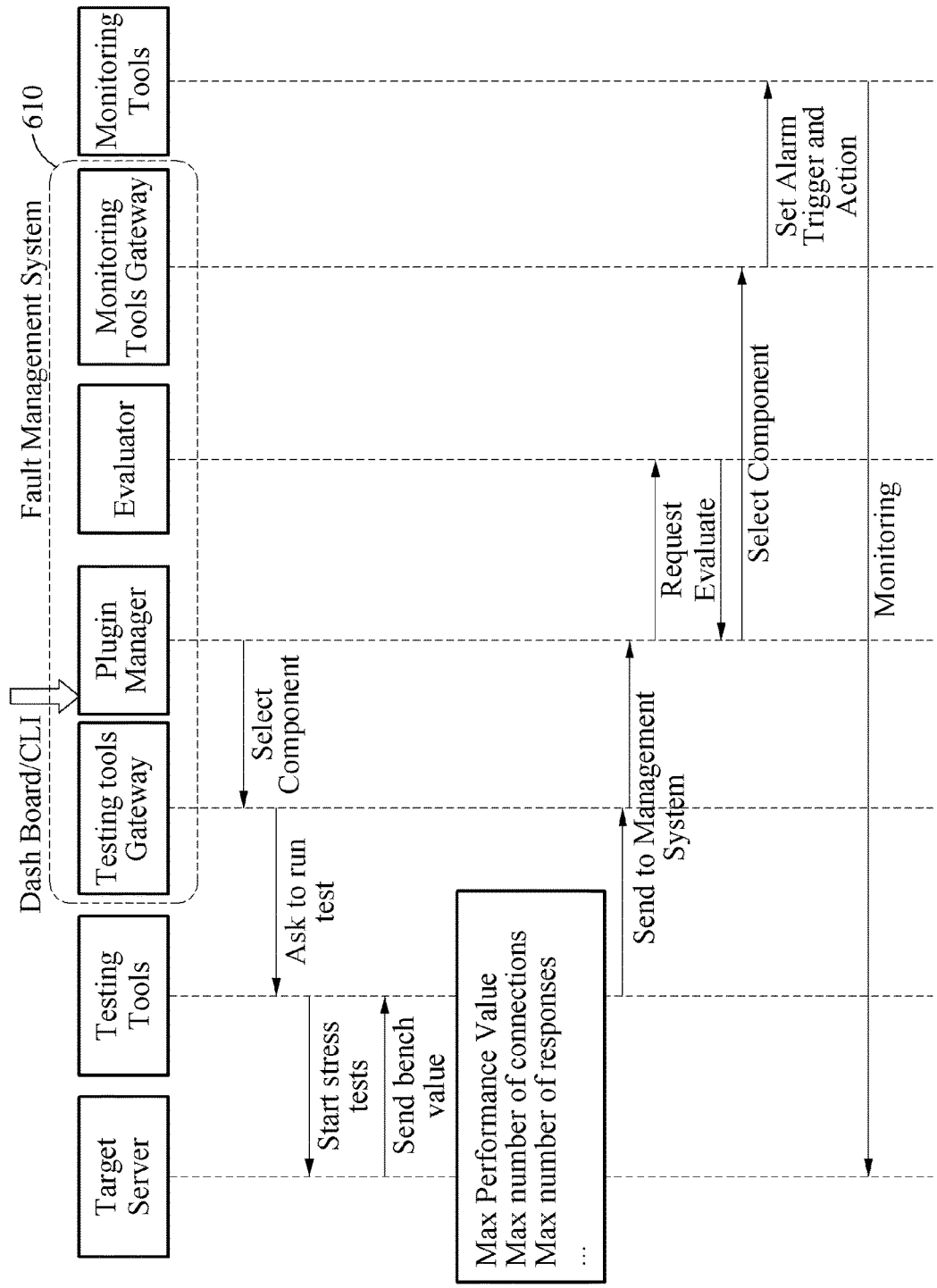
FIG. 6 is a diagram for describing a method for performing network fault management in a cloud environment according to another exemplary embodiment of the present invention.

FIG. 6 is a diagram for describing a method for performing network fault management in a cloud environment according to another exemplary embodiment of the present invention.

Referring to FIG. 6, first, when a plugin manager transmits a request to testing tools gateway, the testing tools gateway may ask the performance verification to open source test tools corresponding to the request through an API. In addition, the testing tools gateway transmits a performance measurement result value to the plugin manager.

The plugin manager generates templated information including a threshold and a policy calculated through the evaluator and transmits the generated templated information to the monitoring tools through a monitoring tools gateway. The monitoring tools set a monitoring policy for the target host based on the received templated information.

According to an exemplary embodiment of using Zabbix as a monitoring function, a method for performing network fault management may be embodied as follows.

First, the Zabbix may set and update a target host to be monitored using Zabbix API and scripts, and link templated information including an item, a threshold, an action, etc. to the target host. Accordingly, in the case of an environment using Zabbix, when the corresponding monitoring tools gateway receives the templated information including the threshold from the evaluator and asks an API to the Zabbix, the Zabbix may link and monitor the templated information set with the threshold and the action calculated based on the performance measurement result to the corresponding target host. In addition, the monitoring tools gateway collects data from the monitoring tools in real time to increase availability through continuous verification and template update.

While the detailed exemplary embodiments of the present invention have been described up to now, various modifications of the present invention can be made without departing from the scope of the present invention. Therefore, the scope of the present invention should not be limited to the exemplary embodiments and should be defined by the appended claims and equivalents to the appended claims.

While the present invention has been described by the limited exemplary embodiments and drawings, the present invention is not limited to the exemplary embodiments and various modifications and transformations can be made by those skilled in the art from the disclosure. Therefore, the spirit of the present invention should be construed based on the following claims and all equivalents or equivalent modifications thereto should be construed as falling within the scope of the spirit of the present invention.

The invention claimed is:

1. A network fault management system for a cloud environment comprising: testing tools processor configured to measure a performance of a target server and output a measurement result; a fault management processor configured to receive and analyze the measurement result output by the testing tools processor, determine a threshold and a policy for a target host based on the analyzed measurement result, and output a determination result; and monitoring tools processor configured to set a monitoring policy of the target host based on the determination result output by the fault management processor, wherein the fault management processor includes a testing tools gateway configured to ask the testing tools processor to measure the performance of the target server and receive the performance measurement result; an evaluator processor configured to determine the threshold and the policy for the target host based on the measurement result and a current state of the target server; a monitoring tools gateway configured to transmit templated information including the threshold and the policy to the monitoring tools processor; and a plugin manager processor configured to transmit the performance measurement result of the target server received from the testing tools gateway to the evaluator processor, and receive the threshold and the policy for the target host from the evaluator processor to generate the templated information including the threshold and the policy and transmit the templated information to the monitoring tools gateway, wherein the evaluator processor calculates the threshold based on a machine learning-based calculation method, wherein the monitoring tools processor is implemented based on Zabbix, the templated information includes an item, a threshold trigger, and an action, and the monitoring tools processor sets and updates a target host to be monitored based on Zabbix API and scripts, and links the templated information to the target host.

2. The network fault management system of claim 1, wherein the monitoring tools gateway receives data from the monitoring tools processor in real time and verifies the target host according to a predetermined period.

3. A method for performing network fault management in a cloud environment comprising: measuring, by testing tools processor, the performance of a target server and transmitting a measurement result to a fault management processor; determining, by the fault management processor, a threshold and a policy for a target host based on the transmitted measurement result and a current state of the target server; generating, by the fault management processor, templated information including the determined threshold and policy; transmitting, by the fault management processor, the templated information to a monitoring tools processor; and setting, by the monitoring tools processor, a monitoring policy of the target host based on the transmitted information, wherein determining the threshold and the policy for the target host based on the transmitted measurement result comprises calculating the threshold based on a machine learning-based calculation method, wherein the templated information includes an item, a threshold trigger, and an action, and the monitoring tools processor sets and updates a target host to be monitored based on Zabbix API and scripts, and links the templated information to the target host.

* * * * *